UNITED STATES PATENT OFFICE.

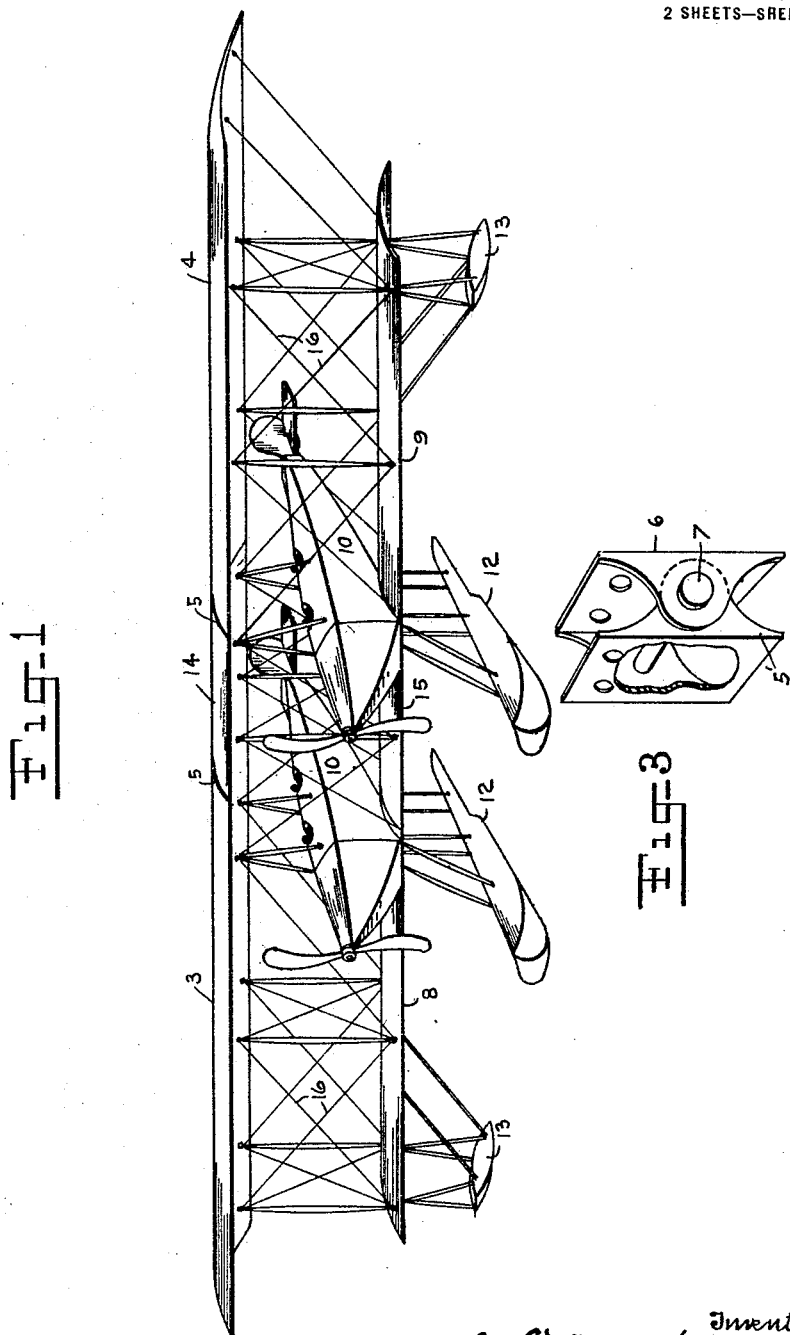

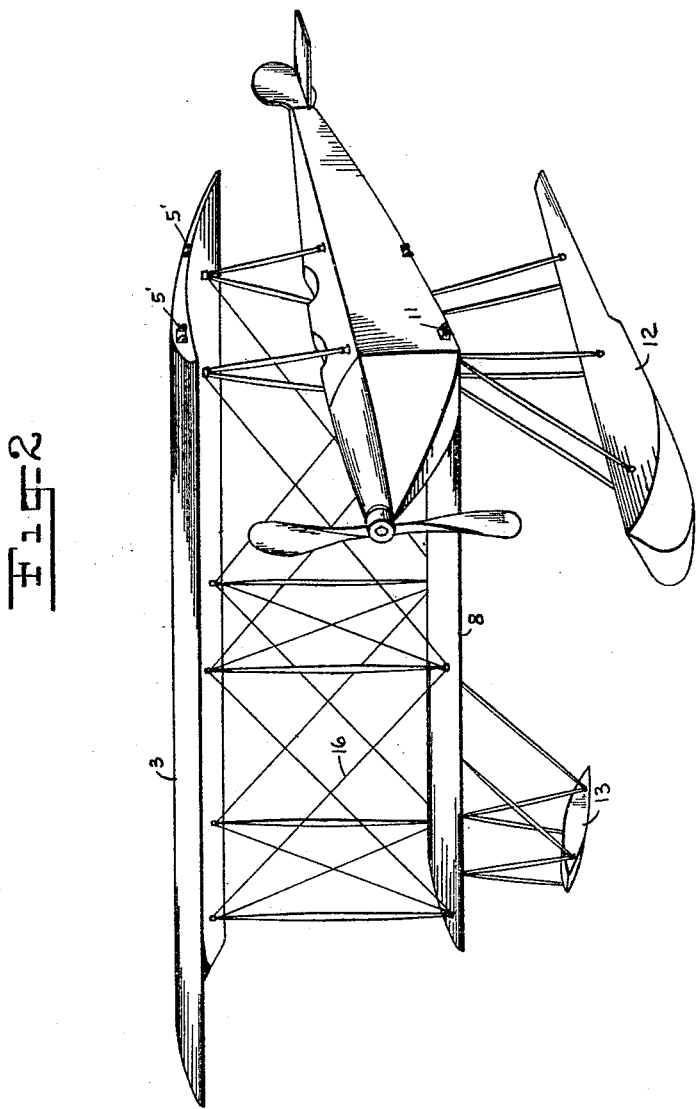

INGLIS MOORE UPPERCU, OF NEW YORK, N. Y.

AEROPLANE.

1,367,218.     Specification of Letters Patent.     Patented Feb. 1, 1921.

Application filed February 5, 1919. Serial No. 275,102.

*To all whom it may concern:*

Be it known that I, INGLIS MOORE UPPERCU, a citizen of the United States, residing at New York city, in the county of New York and State of New York, have invented certain new and useful Improvements in Aeroplanes, of which the following is a specification, reference being had therein to the accompanying drawing.

My invention relates to improvements in aeroplanes and more particularly has reference to and is illustrated in the accompanying drawings in its application to a biplane type of aeroplane comprising interlocking sections, whereby several machines may be interlocked in one.

Referring to said drawings, Figure 1 illustrates in perspective a single biplane type of aeroplane in front elevation made up of the parts of two single machines, Fig. 2 illustrates a similar view of one-half or one side of one of the machines embodied in the structure shown in Fig. 1, and Fig. 3 is an enlarged detail in perspective showing the interlocking cleats.

It is a common practice at the present time to build the upper wing structure in two sections as indicated by the reference characters 3—4 which are interlocked at 5 forming a continuous upper wing section, the cleats 5' being adapted to interlock with the cleat 6 of the other wing section and being retained by a pin such as 7 shown to better advantage in Fig. 3. The lower wing sections 8—9 are provided with similar cleats and likewise the fuselage 10 as indicated at 11 for securing the same. 12 indicates the central boat structure supporting substantially the entire machine when at rest upon the water, and 13 indicates the side balancing floats adapted to keep the machine balanced when upon the water.

When it is desired to increase the capacity of the machine or enlarge it, as shown in Fig. 1, the machine is separated as shown in Fig. 2 and the righthand side of one machine is connected with the lefthand side of another machine by intermediate sections such as 14 connecting the top wing surfaces, and 15 connecting the lower wing surfaces, these sections being provided with interlocking cleats as shown in Fig. 3 and being pinned together in the usual manner and of course additional bracing, stays, struts, or guy wires such as 16 are preferably employed for giving the necessary rigidity and strength to the combination when assembled so that when assembled as shown in Fig. 1, the span of the machine is increased considerably and the power even more in proportion, and a machine thus assembled has double the fuselage capacity as well as double propellers and double main pontoons for supporting the machine upon the water. This affords a practical, quick and convenient method for converting the single fuselage machine of limited capacity into a double machine of greater capacity both as to speed and load and the change can be readily effected simply by carrying a few extra interfitting sections such as 14—15 and the necessary bracing therefor.

Of course it will be understood that various modifications may be made in the construction and arrangement of parts without departing from the spirit of the invention as claimed.

I claim:

In a compound machine of the class described, one side of one machine attached to one side of another machine, means therebetween for continuing the aerofoil surface thereof, and means for securing said sides of said machines so as to form when assembled a continuous unified structure.

In testimony whereof I hereunto affix my signature in the presence of two witnesses.

INGLIS MOORE UPPERCU.

Witnesses:
ANNA F. DUFFY,
DAVID H. DOUGLASS.